April 10, 1951 F. J. COZZOLI 2,548,707
MULTIPLE FILLING MACHINE
Filed Nov. 23, 1946 3 Sheets-Sheet 1

INVENTOR
Frank J. Cozzoli
BY
Harold F. Scribner
ATTORNEY

April 10, 1951     F. J. COZZOLI     2,548,707
MULTIPLE FILLING MACHINE
Filed Nov. 23, 1946     3 Sheets-Sheet 2

INVENTOR
Frank J. Cozzoli
BY
Harold F. Scribner
ATTORNEY

April 10, 1951  F. J. COZZOLI  2,548,707
MULTIPLE FILLING MACHINE
Filed Nov. 23, 1946  3 Sheets-Sheet 3
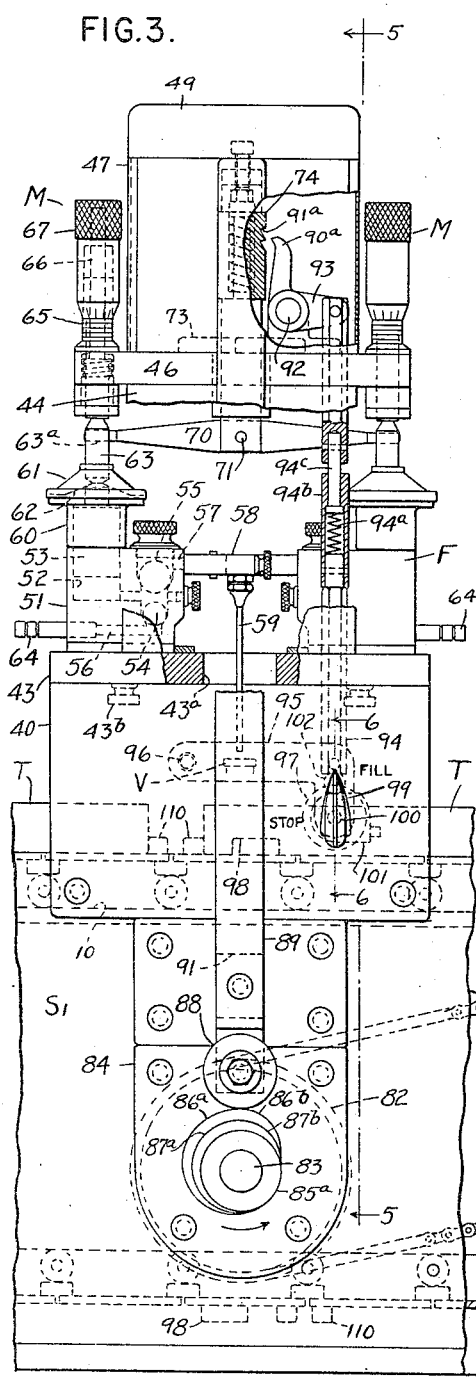
FIG. 3.
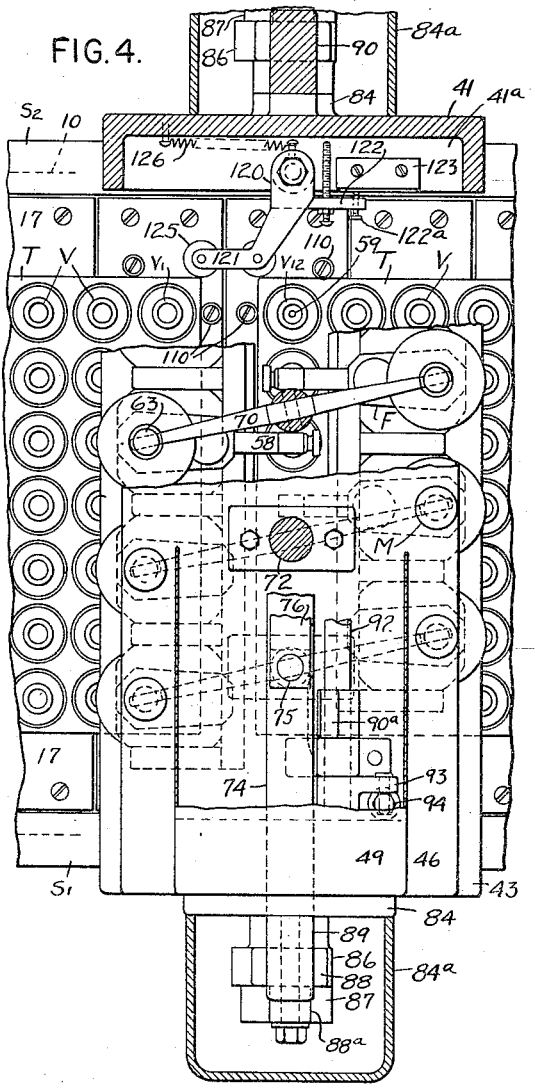
FIG. 4.
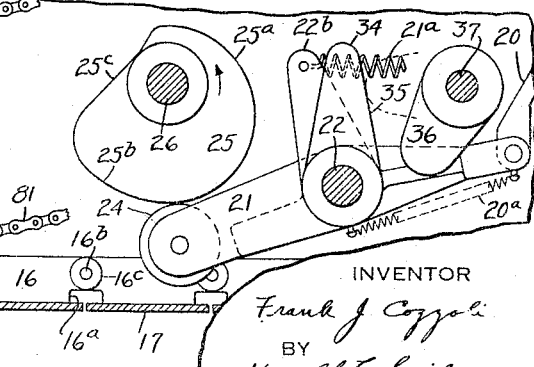
INVENTOR
Frank J. Cozzoli
BY
Harold F. Scribner
ATTORNEY Patented Apr. 10, 1951

2,548,707

UNITED STATES PATENT OFFICE 2,548,707

MULTIPLE FILLING MACHINE

Frank J. Cozzoli, Plainfield, N. J.

Application November 23, 1946, Serial No. 711,902

11 Claims. (Cl. 226—99)

This invention relates to dispensing machines of a character adapted to fill vials, or like containers, with accurately measured quantities of pharmaceutical preparations, as, for example, penicillin or other serums or drugs in liquid form.

The invention has for its primary objectives to obtain and maintain (a) a high standard and condition of sterility in and about a filling machine for this purpose; (b) extreme accuracy in the quantity of the preparation injected into each vial or container; (c) a high output rate, on the order of 1,000 or more fills per hour per dispensing unit, in conjunction with a provision for automatically suspending operation of the dispensing units at the end of a normal run of vials and for temporarily discontinuing the operation of the dispensing units where a gap or blank occurs in the procession of vials, as for example when the space between trays in which the vials are carried arrives in the filling position.

By way of additional refinement the invention undertakes to provide manually operable means, operable at will, to start or to stop the filling operation of the dispensing units, and also for independently initiating or discontinuing the progressive movement of the vials past the dispensing units.

Still a further objective is to render available a dispensing apparatus capable of filling a multiplicity of vials simultaneously, each with an independently and accurately measured quantity of the preperation to be packaged, and to provide each dispenser with a positive acting means for regulating and obtaining certainty in the delivery capacity, measured in whole and in fractional units of $\frac{1}{10}$ cc.

Another object of the invention is to render available an improved method of constructing a filling machine utilizing a relatively few basic elements that require little and simply performed machining and which may be readily fashioned to suit a specific vial tray arrangement or requirement and thereafter assembled to form the complete custom built machine.

The machine of the present invention fills a long standing need in the pharmaceutical industry. Insofar as I am aware, no previous attempt to meet the industry's need has been made, other than the single head, manually controlled, filling machine disclosed in my prior patent application Serial Number 524,417, filed February 29, 1944, now Patent Number 2,415,419, dated February 11, 1947. If only a few hundred fills per hour is wanted, that type of machine is satisfactory, provided the product being packaged was not subject to contamination either by the manual handling of the containers or by the very proximity of the operator to the filling head of the machine.

The multiple filling machine of the present invention is designed to fill a plurality of vials simultaneously and renders the presence of the attendant, in close proximity to the filling units of the machine, no longer necessary, i. e. after the machine is once set up for a run of fills, its operation is fully automatic. The vials to be filled are placed in trays and pass directly from a sterilizer to the filling units upon an intermittently movable carrier, and when each tray has been correctly located, the succeeding operations of positioning the vials adjacent the filling nozzles, holding them there until the filling cycle has been completed, and moving them away and positioning a new group adjacent the nozzles, is entirely power operated and automatically timed and controlled. When a blank occurs, as the space between successive trays of vials, each filling head is caused automatically to cease its filling operation for the requisite period and then to resume its filling cycle when the next vial or vials come into position. Also, the machine is so organized that when the last vial of a run of trays of vials has been filled, not only is the operation of the filling units suspended, but the operation of the carrier propelling mechanism as well. The embodying of the mechanism and controls of the character mentioned eliminates the constant attendance of an operator and the turbulent atmosphere created in close proximity to the filling units, as an incident thereto. From the standpoint of maintaining sterile conditions, quietness of operation in and about the machine is highly important.

Still a further aim of the invention is to render available a vial transporting mechanism adaptable to various vial and tray requirements, and this invention proposes a carrier constructed preferably in the form of an endless conveyor made up of chained links operating over sprocket wheels. The link dimensions and sprocket dimensions are preferably proportioned with relation to the distance the conveyor is to be indexed between filling operations, and also with relation to the aggregate distance the conveyor is to be moved for a complete tray, including one gap. To obtain maximum operating efficiency this invention further proposes a carrier, the total length of which is a multiple of the distance required per tray and gap, so that tray locating devices and control cams can be established on the carrier at fixed points for the purpose of exercising cyclic control of the operating mechanisms without unused conveyor portions being present or recurring.

In its essentials, the machine of the present invention is composed of a pair of leg standards upon which are mounted, in spaced apart relation, elongated frame elements. The frame elements provide supporting means for the sprocket wheels of the conveyor as well as for the conveyor index mechanism and filling unit actuating mechanism which preferably is located between the frame members and between the upper and lower runs of the conveyor. Supported on top and medially of the ends of the frame is a filling unit tower structure composed of spaced shelves which locate and support a plurality of filling units and their related actuating and control mechanisms.

The filling heads per se are identical in structure and interchangeable. Each comprises a piston and cylinder member having inlet and discharge ports, valve controlled. Power means in conjunction with a discriminating yield device, effects piston displacement in a pump intake direction and gravitational forces effect piston displacement in a pump discharge direction. Each filling unit is provided with a volume control device graduated in whole and fractional units, to provide positive and accurate means of controlling the volumetric capacity of the unit. Power for operating the conveyor and the dispensing units enters the machine from the outside and consists of an electric motor and a speed reduction unit driven therefrom. These elements are substantially entirely enclosed in a vented housing so that the turbulence created thereby is prevented from reaching the filling units. Various cams, levers, etc. convert the continuous motion of the power source into intermittent motions required for the vial indexing and filling operations as will hereinafter be explained.

In operation, the machine is caused to receive successive trays of empty vials, direct from a sterilizer, fill the vials intermittently row after row, and to advance the trays of filled vials forward for other processing, without handling. The locating of the successive trays on the conveyor completes the attendant's duty about the machine, all of the functions of indexing, filling, skipping, and stopping after the last tray passes the filling units, being performed automatically.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 3 is an enlarged view of the tower mechanisms and driving mechanisms with parts broken away more clearly to illustrate the structure.

Fig. 4 is an enlarged view of the tower mechanisms taken in stepped planes corresponding substantially to the horizontal planes of line 4—4 of Fig. 2.

Fig. 5 is a transverse view of the tower partly in section, and taken substantially along line 5—5 of Fig. 3.

Fig. 6 is a vertical sectional view, on line 6—6 of Fig. 3.

Fig. 7 is a diagrammatic illustration of a motor circuit.

Fig. 8 is an enlarged sectional view, on line 8—8 of Fig. 1.

Figure 1:
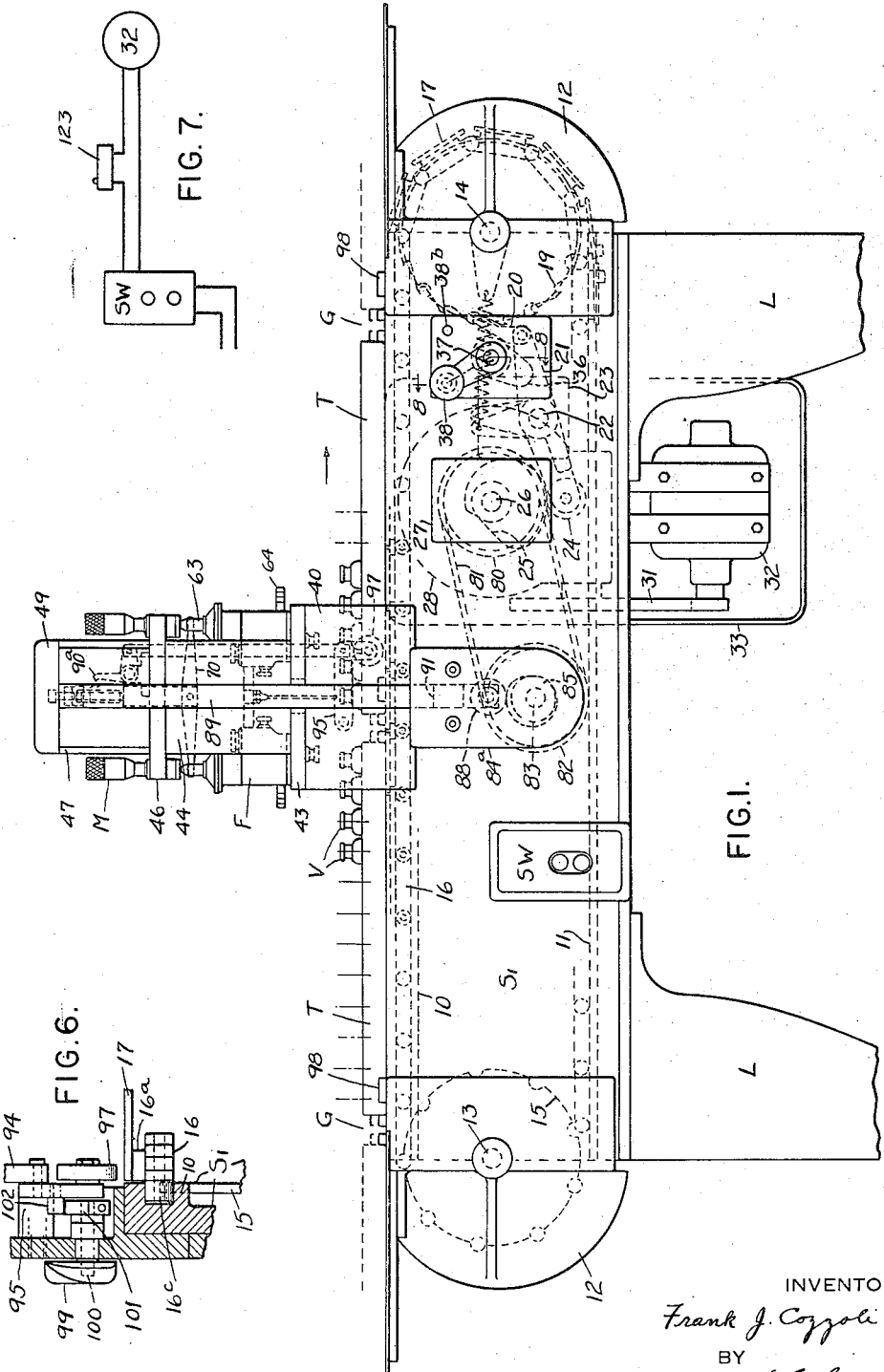
Figure 1 is a side view of a multiple filling machine embodying the invention.

Referring more particularly to Fig. 1 of the drawings, the machine illustrated comprises, a pair of leg standards L (the lower portions not being shown) which support at their top two spaced apart side members $S_1$ and $S_2$. The side frames are elongated, substantially flat, plates and are provided on their inner surfaces with upper and lower conveyor supporting tracks 10 and 11. The side frames extend vertically in parallel planes and when bolted or otherwise secured to the leg standard form rigid side walls and bearing mounts for the drive mechanisms contained between the frames. At each end of each frame member, a sprocket shaft bearing plate 12 is firmly secured, and sprocket shafts 13 and 14 are journaled therein. The sprocket shafts 13 and 14 extend crosswise the machine, as will be understood, and have pairs of sprocket wheels 15 pinned thereto, one at each side. The distance between the centers of the sprocket shafts 13 and 14, the number of notches or teeth (pitch) on the sprocket wheels 15, bear a definite relation to the length and number of vial holding trays that the machine will accommodate and must be determined beforehand with due regard to the number and spacing of the vials in each tray and the length of the gap between trays.

In the instant embodiment of the invention, the vial trays T are designed to contain twelve vials lengthwise, and seven vials crosswise. Provision is made in the carrier length for a gap length G between groups of vials equal to the space between two adjacent vials lengthwise the machine. The linear distance between the first vial of one tray and the first vial of a succeeding tray, is what may be termed a "tray length," and preferably is divided into an equal number of parts which establishes the length of the conveyor links 16. In the particular embodiment illustrated, there are 6½ links per tray-length, and the total length of the conveyor is six traylengths, or 39 links. The length of the conveyor link is one of the factors used to ascertain the pitch diameter and number of teeth on the sprocket wheels 15, which, in this case has been determined as 9. When 9 links are on the sprockets (4½ on each end), thirty remain and form the upper and lower runs of the conveyor. Two bands of links, running parallel to each other and in phase, and located at opposite sides of the machine, are provided in the present embodiment.

Figure 2:
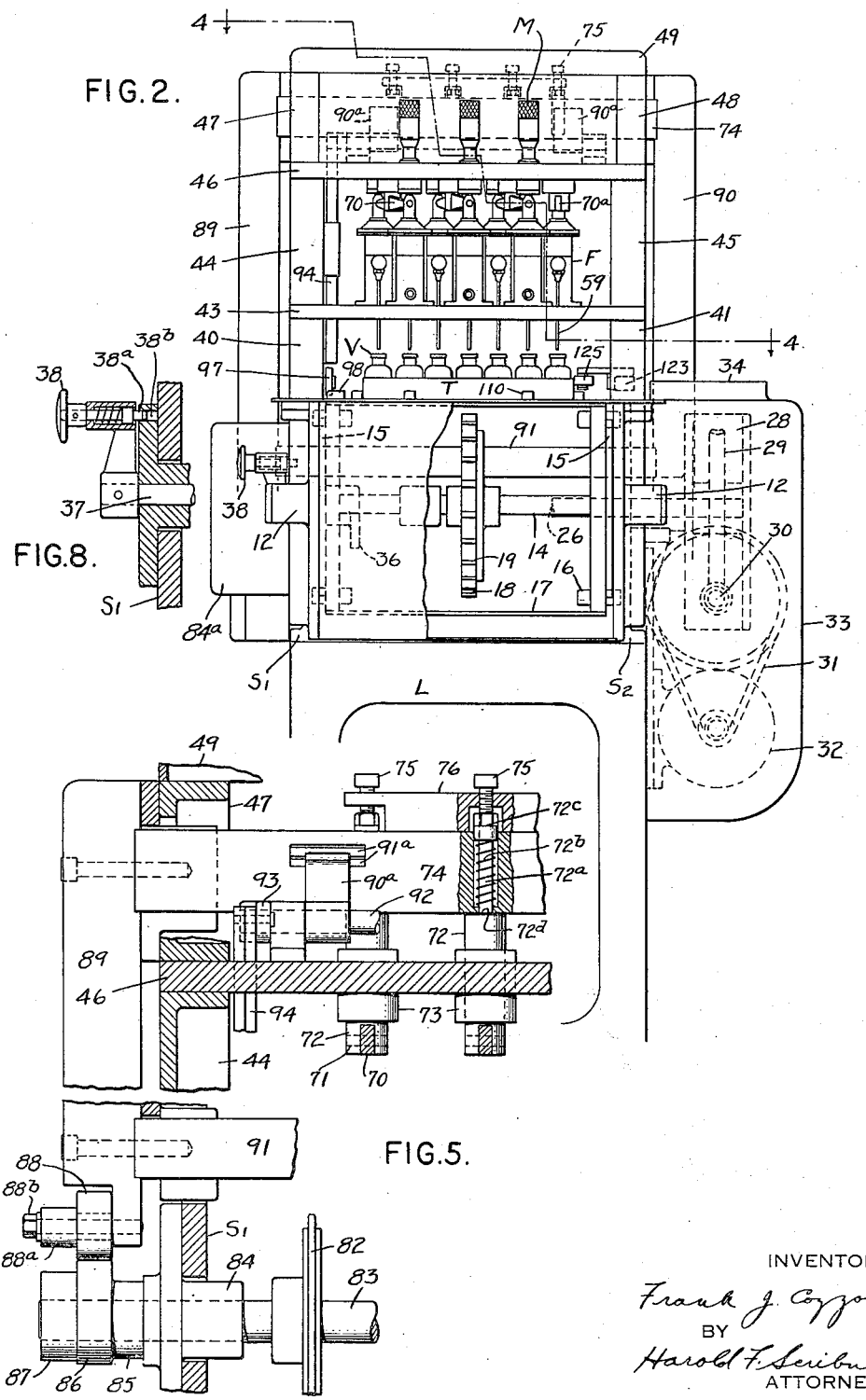
Fig. 2 is an end view of the machine shown in Fig. 1, with certain portions broken away to illustrate interior mechanism.

The conveyor links 16 are illustrated more clearly in Fig. 3, and each is provided with a male end and a female end, for uniform interfitting and pivoting to each other. The medial portion of 16a of each link is raised slightly to provide a bearing surface for the conveyor crossplates 17. One of the pivots 16b of each link carries a side roller 16c that rolls upon the tracks 10 and 11 provided by the frame members. A portion of each roller is also engaged by the teeth in the sprocket wheels 15 as it leaves the straight portions of the conveyor runs (Fig. 2).

*Conveyor indexing mechanism*

The shaft 14 carries medially of its ends a ratchet wheel 18 provided with teeth 19 that are adapted to be successively engaged by a pawl 20. The pawl 20 is pivoted to one end of an index lever 21 that is fast on a horizontal shaft 22. The shaft 22 is journaled in bearings 23 secured to the inner walls of the frame members and is free to oscillate. The other end of the index lever carries a follower roller 24 that tracks and is actuated by a cam 25 secured to a main cam shaft 26. The shaft 26 is journaled in bearings 27 secured to the frame members and extends through the rear frame into a speed reduction housing 28 that houses a worm wheel 29 and driving worm 30. A belt and pulley system, indicated generally at 31 transmits power from a motor 32 to the worm 30. A housing 33, having an exhaust vent 34 at its top, surrounds and encloses the speed reduction unit, pulleys, belt, and motor so that the motor fouled air and disturbance created by the main drive mechanism is confined within the housing 33 and from which it may be conveniently exhausted or otherwise taken away from the machine. The motor 32 is connected with and controlled by a main switch SW provided at the side of the machine.

The index cam 25 is constructed with a rising portion 25a, a dwell portion 25b, and a descending and resetting portion 25c, proportioned as to magnitude and arcuate length to effect repeated indexing movements of the conveyor in amounts equalling the vial spacing, with a dwell period between index movements adequate for the vial filling operation. A tension spring 20a connected between the index pawl 20 and lever 21 yieldingly maintains the pawl in operating position, and another spring 21a connected to a lever 22b on the shaft 22, is provided to reset the index pawl and normally to maintain the roller 24 in abutting relation with the index cam 25.

Index lever holdout

The index lever shaft 22 carries a second lever 34, one side 35 of which functions as an abutment. A cam 36 on a shaft 37 located adjacent the lever 34 is adapted to coact with the abutment surface 35 to hold the index lever 21 out of action in its most advanced position. The cam shaft 37 extends through the frame and is provided with a pull pin type of handle 38 by which it may be oscillated from the position illustrated in Figs. 1 and 8 to a position such that the pull pin 38a in the handle registers with the other of the two locating holes 38b (only one shown). The positions mentioned correspond to the full and dotted line positions respectively of the cam 36 shown in Fig. 3, the former position permitting indexing, and the latter position holding the index lever 21 ineffective. When the pull pin handle 38 is shifted to the hole 38b, the cam will occupy the dotted line position (Fig. 3) and the index lever roller 24 is held out, and its driving cam 25 rotates without producing conveyor movement. Two or more index levers may be controlled selectively in this way, when two or more different index spacings per tray length are required in a given machine.

Tower structure

Medially of the length of the frame members flanged tower risers 40 and 41 are located and firmly secured, one at each side of the machine (Fig. 2), and across the tops of which a filling unit supporting plate 43 is bolted. A second set of risers 44 and 45 are superposed upon the plate 43 and support a micrometer plate 46 across their tops. And a third set of risers 47 and 48 are superposed on the plate 46 and supports a cover 49. The risers, cross plates, and cover are bolted and pinned together and form a rigid box-like structure having spaced shelves, firmly united with the main frame members S1 and S2.

The letter F indicates a filling head unit, of which in the instant machine seven are employed, and M indicates a volume control device in the form of a micrometer stop, one stop device being operatively related and associated with each filling head. These assemblies per se are similar to the corresponding assemblies disclosed in detail in my aforesaid patent application and to avoid undue repetition only a brief description will be set forth herein.

Filling head

As all the filling heads are alike and interchangeable, but one will be described. Referring to Fig. 3, each filling head comprises a body member 51, in which is provided a cylinder 52, and a cooperating piston 53. Ball valves 54 and 55, located in intake conduit 56 and discharge conduit 57, respectively, control the flow of the preparation into and out of the cylinder. The discharge of fluid is through a nipple 58 and a vial filling needle or nozzle 59. The needle 59 projects through an opening 43a in the unit supporting plate 43 and terminates slightly above the top of a vial stationed therebeneath. The upper part of the cylinder 52 and the piston 53, is enclosed by a housing 60 and 61 in which is also contained a flexible diaphragm 62 that closely surrounds the piston rod extension 63 and prevents ingress of foreign or contaminating matter to the cylinder. The nipple 64 of each unit is adapted to be connected to a bulk source of the preparation. When the piston 53 is reciprocated, fluid is drawn into the cylinder chamber 52 through conduits 64, 56 past the ball valve 54, and discharged through conduits 57, 58, and 59 past ball valve 55, valves 54 and 55 alternately opening and closing their respective passages, as in an ordinary pump. Each of the filling units is accurately positioned and removably held in place upon the plate 43 by clamp screws 43b, with the several heads oppositely positioned and staggered as illustrated in Fig. 4 whereby to position the respective discharge needles 59 in an alignment corresponding to the alignment of the vials in the trays.

Micrometer stop

Above and aligned with each filling head piston, a micrometer stop device M is located. Referring more particularly to Fig. 3, each micrometer stop comprises essentially, an exteriorly graduated and interiorly threaded barrel member 65 that is fastened securely to the plate 46; a centrally disposed threaded spindle 66; and a graduated sleeve 67 pinned to the upper end of the spindle. The lower end of the spindle is adapted, by means of its threaded connection with the fixed barrel, to be adjusted toward or away from the end of the filling unit piston rod extension 63, the intervening space being the precise distance the piston of the filling unit is permitted to move. In this way the volumetric displacement of each filling unit may be individually determined with a high degree of exactness.

Filling head actuating means

When the number of filling heads per machine permits, the front and rear heads are connected in pairs by cross arms 70. Each arm is pivoted at 71 to a vertically movable plunger 72 that is reciprocably mounted in a bushing 73 carried by the plate 46 (Fig. 5). The free ends of the cross arms are reduced in size and enter transverse openings 63a formed in the piston extensions 63 of the filling units. Upward movement of the plunger 72, accordingly, elevates the pistons until each is positively stopped by the anvil of its respective micrometer, the pivoted cross arm member functioning as an equalizer. When the number of filling units per machine is odd, one of the units, preferably the end unit, is connected to a vertically movable plunger by means of a non-pivoted half cross arm. The arm 70a shown at the extreme right in Fig. 2, is of this type.

Each of the several plungers 72, has a yielding connection with a cross bar 74, which comprises (Fig. 5) a reduced extension 72a about which a compression spring 72b is fitted. The extension 72a enters a hole provided in the bar 74, which hole is enlarged from the upper side of the bar to house the spring 72b. The spring abuts the lower end wall of the recess thus formed and reacts against a guide plug and retaining nut 72c mounted upon the upper end of the extension 72a. The shoulder 72d on the plunger is by this means normally brought up against the underside of the cross bar 74. However, when upward movement of the pistons of the filling heads is positively stopped by the micrometers, any additional upward movement of the cross bar 74 (as will later be explained) further compresses the spring 72b. Upon movement of the cross bar in the opposite direction (downwardly) the cross bar will press upon the shoulder 72d and depress the plungers, the crossarms 70 and filling head pistons 53 moving corresponding amounts effecting discharge of the preparation previously entrained in the cylinders, into the vials. To insure accuracy and completeness of the discharge of each pair of filling heads, individual compression screws 75 are mounted above and aligned with the plunger extensions 72a. The screws 75 are threaded through a supplemental bar 76 carried by the cross bar 74 and are adapted to be individually adjusted against the plungers 72, 72a, so that each piston of each filling head is caused to return to its lowermost position relative to its cylinder upon the down movement of the cross bar 74 its full distance. The down movement of the cross bar 74 is effected by gravity and as it lowers, its entire weight hangs upon the piston plungers of the filling heads insuring the full and complete discharge from each.

Cross bar and plunger elevating means

As indicated above, the cross bar is vertically movable, and to effect such movement, power means has been provided. Figs. 1, 3 and 5, illustrate the structure most clearly, which includes a sprocket wheel 80, fast on the main drive shaft 26, an endless chain 81, and another sprocket 82 driven by the chain. The sprocket 82 is secured to a transversely extending shaft 83 journaled in bearings 84 provided by the frame, and carries at each end a stepped cam 85. The stepped cams are positioned on each side of the machine and actuate antifriction rollers 88 that are removably mounted to the lower ends of vertically extending bars 89 and 90. The bars 89 and 90 extend upwardly along the sides of the tower (Figs. 2 and 5) and are notched to receive the ends of the cross bar 74, and bolted securely thereto. The lower end portions of the uprights 89 and 90 are notched to receive the ends of another cross bar 91, and bolted securely thereto. The construction described affords a vertically movable box-like structure that surrounds the filling heads, and which carries at its lower portion the removable anti-friction rollers 88. Fig. 5 illustrates the rollers 88 aligned and tracking the larger step 86 of the cam 85 (the roller on the opposite side of the machine is similarly positioned) and when so related, rotation of the cam 86 effects vertical movement of the boxlike frame (89, 74, 90, 91) a given maximum distance, the plungers 72 connected with the bar 74, and the cross arms and the filling pistons responding also. When the rollers 88 are removed from the vertical bars and turned around so that they track the smaller cam 87, the box frame, plungers, etc. are similarly actuated but to a lesser extent. As the actuating cams revolve, their descending portions 86b and 87b, limit the descent (by gravity) of the box frame 89, 74, 90, and 91 and the downward movement of the pistons 63 to a rate best adapted to effect a quiet and harmonious discharge of the liquid into the vials. At the dwell portion 85a of the cams, a slight clearance is provided so that at the end of the discharge stroke the weight of the entire box frame 89, etc., plungers 72, and cross arms 70 hang upon the pistons 53 whereby to insure completeness in their respective strokes and accuracy and uniformity in the successive discharges.

For convenience in making a change in the available stroke of the filling head pistons, each of the follower rollers 88 is provided with a spacer extension 88a and securing studs 88b are provided, designed to pass through the roller and its extension from either side. Removable guards 84a are provided to enclose the cams 85 during normal use of the machine.

The purpose of the stepped cam actuator is to reduce the extent that the spring 72b of each piston lifting plunger is compressed when the related micrometer stops are adjusted to hold the delivery quantity to less than maximum. Normally the stroke imparted by the cam to the cross bar 74 should always exceed the piston stopping point, controlled by the micrometers, to insure that each filling head piston will be displaced (on its intake stroke) its correct amount, but the excess travel of the actuator should not be so great as unduly to burden or impair, by reason of excessive spring compression, the accuracy of the micrometer stops. Therefore, this invention proposes an improved means for dividing the total throw of the actuating cam into two (or more if desired) working ranges wherein and whereby delivery settings above and below given values may be more efficiently effected by selecting the proper size of cam. A further advantage of adapting the actuator to the necessary piston stroke requirements is that almost the entire periphery (360°) of the cam 85 is utilized in reciprocating the pistons of the filling units, and if one large cam only was employed, but only half, for example, of its stroke was needed to reciprocate the piston of the filling unit, approximately only half of the cam's periphery (180°) would be utilized. This would mean that the intake and discharge strokes of the filling head would be caused to occur on only a fraction (approximately half) of the cam's periphery, with consequent abruptness in cessation and starting of fluid flow, provoking splashing and unnecessary overburdening of the machine elements, one half the time. By dividing the actuating cam into two or more parts, with means for conveniently shifting from one lobe to another, an approach toward a variable stroke mechanism is made with the attending advantages of slow start, followed by accelerating piston movement and dwell periods, at the end of both the intake and the discharge strokes, as to each of the various sizes of cams embodied. Moreover, the entire periphery of the cam is utilized and improved timing and delicate and critical gradations in timing may be obtained.

Latch mechanism

Occasionally, it is necessary to stop the action of the filling heads, i. e. when the gap between trays is reached, or for testing or sampling purposes, and automatic and manually controlled means have been provided for this purpose. Referring to Figs. 2, 3, 5, and 6, a preferred form of unit lock out mechanism is illustrated which comprises one or more pawl elements 90a mounted upon the plate 46 so that their operating ends lie adjacent the bar 74. Beveled notches 91a are cut into the bar at levels, relative to the pawl, that correspond with the high portions of the respective actuating cams 86, 87. The pawls are mounted upon a rock shaft 92, from one end of which extends a short lever 93. A rod 94 is connected to the lever 93 and extends downwardly, through plates 46 and 43 and connects at its lower end with another lever 95 which is pivoted as at 96 to the riser 40. The lever 95 also carries a roller 97 in substantial alignment with the rod 94, that is adapted to cooperate with skip cams 98 mounted upon the conveyor plates. As one of the cams approaches and lifts the roller 97, the rod 94 is elevated, and in turn, rocks lever 93 and the pawls 90a into one of the recesses 91a in the cross bar 74. This action of the mechanism is caused automatically to occur when the last vial of a tray has been filled and the conveyor begins to move a blank space (the gap G between trays) into position under the filling needles. The length of the skip cams 98 are also proportioned to continue holding the pawls 90a in engagement with the bar 74 until the first row of vials of a succeeding tray comes into position under the needles.

The plunger lifting bar 74 may also be latched up, out of action, manually by turning a knob 99 from the "Fill" position shown in Fig. 3 to the "Stop" position indicated. The knob 99 is mounted upon a shaft 100 that carries at its inner end a cam 101 operatively related to an abutment pin 102 projecting from the side of the lever 95 (Fig. 6). The cam 101 is formed with a high portion which when rotated into position under the abutment pin 102, holds the lever 95 elevated and likewise the pawl rod 94.

To protect the latch mechanism against injury due to inadvertent operation, the pawl rod 94 is constructed preferably in two parts, the adjacent ends of which are tensioned apart by a spring 94a. A sleeve 94b surrounds and telescopes a shouldered extension 94c of the upper section of the rod 94, and is secured to the lower section. The sleeve and the coacting shoulder portions hold the rod sections together, yet permit a reasonable amount of relative endwise movement to occur between the rod sections when necessary. This safety feature guards against machine injury should the plunger actuating bar be latched up by the pawl being positioned in the upper notch (smallest cam 87 serving as the initial actuator) and then inadvertently removing and turning the follower roller 89 around so that the large cam 86 becomes the actuator. When set in motion the larger cam 86 would attempt to lift the cross bar further even though it was latched by the pawl. With the disclosed yield device incorporated, however such additional movement that may be imparted to the cross bar 74 merely causes the pawl 90 to be cammed out of the notch in which it was initially moved or locked.

Absent tray control

The upper portions of Fig. 4 illustrates, in plan, a preferred form of mechanism adapted to bring the entire machine to a stop whenever the trays of vials do not follow one another continuously. This figure illustrates two trays T of vials properly located upon the conveyor plates 17 by means of a series of screw fastened locating buttons 110, two being provided near each corner of each tray. The locating buttons that are between two trays, as well as the handles that are attached to the tray ends, usually prevent compacting of the trays on the conveyor any closer than one vial spacing or one index movement of the conveyor. And with certain trays, or to meet certain conditions such as to gain or lose a fraction of a conveyor link, two vial spacings or index movements may be necessary between the last and first vials of successive trays. In the embodiment illustrated the gap between the last vial of a preceding tray and the first vial of the following tray is made equal to one index movement, and under normal conditions of operation, the cams 98, bar 94, and latch mechanism 90a, etc., function to hold the plunger actuating bar 74 in its elevated position (suspending operation of the filling heads) during the time the conveyor is indexing through the blank space between trays. Should there be no tray following the blank space, the roller 97 would drop off the cam 98, the pawl 90 would unlatch the plunger bar 74, and the filling units would discharge their contents over the machine. To prevent such accidents a control device has been incorporated which functions to stop the machine with the plunger bar 74 in latched position, as a filled tray leaves the filling station if it is not followed by another. A mechanism for this purpose may assume varied forms, but as the trays themselves, or their absence, is the critical factor, the present invention proposes a mechanism that responds to the presence or absence of the trays. A control means for this purpose comprises a two-armed lever 120, one arm 121 of which, reacts to tray movements and the other arm 122 of which operates a "Micro" switch 123. The lever is pivoted at 124 to the side of the machine, preferably to the base flange 41a of the riser 41, and the arm 121 thereof extends outward substantially in alignment with the sides of the trays T. Two anti-friction rollers 125 are pivoted to the lever arm 121 in spaced relation so that their outer peripheries span the gap between successive trays and normally engage the sides of the trays. The switch arm 122 of the lever 120 carries an adjustable switch operating screw 122a that is set to clear the actuating button of the normally closed "Micro" switch 123. A tension spring 126 connected with the lever 120 tensions the rollers 125 outwardly (toward the center of the machine) so that in the absence of a following tray, the lever 120 will swing counter-clockwise (in Fig. 4) as soon as the tray that is at the filling station leaves that station. The counterclockwise movement of the lever 120 causes its arm 122 and the screw 122a to engage and operate the "Micro" switch to "open" position. The circuit of the "Micro" switch is connected in series with the main starting switch SW and the motor 32, as illustrated diagrammatically in Fig. 7, and the opening of the "Micro" switch breaks the circuit to the motor and the latter comes to a stop. As there is no appreciable coast of the main drive, carrier, etc., the machine stops with the filling head pistons elevated, their intake strokes completed, and maintained in that position by reason of the fact that the lift rolls 88 are upon the high dwell portion 86a or 87a, as the case may be, of the cam 85.

Operation

A full tray of empty vials is placed upon the conveyor and located by the buttons 110, with the first row of vials under the discharge needles 59. The filling heads F are connected to a source of the preparation to be injected in the vials and the micrometer stops M adjusted for the delivery desired. The starting switch SW is then actuated which starts the machine cycle. On completion of the filling of the first row of vials, the carrier indexes one position which brings the second row of vials into position under the filling needles. During the index movement, the pistons of the filling heads are moved upwardly, on their intake strokes by the cams 85 and as the index movement finishes, the intake strokes have been completed. While the carrier and vials are at rest, the pistons of the filling heads descend and expel the contents of their respective cylinders into the vials, meanwhile the index cam 25 is turning so that the index lever roller 24 tracks the resetting portion 25c thereof and the spring 21a resets the index pawl in preparation for the next index movement. The filling and indexing cycles are repeated until the last row of vials of the tray have been filled and as soon as they begin to move away from the filling station, one of the cams 98 engages and elevates the latch actuating roller 97. This occurs as the filling head pistons reach the end of their intake strokes, whereupon the bar 74 becomes latched and the pistons prevented from moving on their discharge strokes. Thereafter one or more index movements are completed, which (with the filling pistons latched) brings the first row of vials of a succeeding tray into filling position. At this point, the latch roller 97 will have dropped off the cam 98 and the latching pawl 90 will be disengaged from the bar 74. Thereafter, the filling of the vials, row after row, with intervening indexing movements continues as before. Should a tray of vials not be followed by another tray, the control lever 120 and switch 123 will be actuated, as above explained, and the machine brought to a stop. The machine may also be stopped at any time by pressing the stop button of the main switch SW. Filling without indexing may be effected by operating the index lever control handle 38 to its index hold-out position, or indexing without filling may be effected by turning the latch knob 99 to "stop" position.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of the following claims.

Having thus revealed this invention, I claim as new and desire to secure the following combinations and elements, or equivalents thereof, by Letters Patent of the United States:

1. A filling machine having in combination an endless conveyor mechanism constructed of connected links adapted to transport trays of vials thereon with the trays uniformly spaced apart and with the vials in each tray uniformly spaced from each other a unit distance, the length of the said space between successive trays being equal to a whole number of the unit spacings between the vials in a tray, the total length of said conveyor being a whole number multiple of the number of links occupied by one of said trays of vials plus the said space between two adjacent trays, and said links each having a length equalling twice the spacing of the vials in said trays, relatively stationary vial filling means adjacent the conveyor operative cyclically to fill the vials when they are in filling relation therewith, conveyor indexing means constructed and arranged to move the conveyor intermittently and in uniform increments equalling one-half of a link length so that the individual vials of each tray are successively moved in uniform increments to the relatively stationary vial filling means, and conveyor actuated means operative automatically to render said filling means ineffective during the interval the conveyor is moving a tray of filled vials away from the filling means and a tray of unfilled vials into filling position.

2. A filling machine for filling a series of rows of vials with a pharmaceutical preparation combining a series of individual dispensing means arranged with their discharge nozzles aligned in conformity with the alignment of the vials in said rows of vials, each of said dispensing means embodying a movable element operative to effect the dispensing operation and whose extent of movement determines the quantity volumetrically to be dispensed, means for actuating all said movable elements in unison, said means including a member having a normally fixed stroke and yieldable means between said member and said movable elements, adjustable but normally positive means individual to each dispenser for limiting the extent of movement of its associated movable element whereby independently to regulate the quantity of preparation to be dispensed by each dispenser irrespective of the extent of movement of said member having a normally fixed stroke, means for changing the stroke of said member to a value less than said normal stroke thereby to relieve said yieldable means of excessive pressure when said adjustable means are adjusted to appreciably decrease the extent of movement of the movable elements of the dispensers, and means for positioning successive rows of vials in filling relation with the discharge nozzles of the said dispensers to receive simultaneous filling.

3. The combination set forth in claim 2 in which said actuating means includes an equalizing connection between each two of said moveable elements.

4. A filling machine combining a liquid dispensing means embodying a movable element adapted to effect the dispensing operation and whose extent of movement determines the quantity to be dispensed, means for actuating said movable element, said means including a member having a normally fixed stroke and a yieldable connection between said member and said element, adjustable means for limiting the extent of movement of said movable element in response to the movement of said member to regulate the quantity of the liquid to be dispensed irrespective of the extent of movement of said member having a normally fixed stroke, means for changing the stroke of said member to a value less than said normal stroke thereby to relieve said yield means of excessive pressure when said dispenser is adjusted to dispense appreciably less than its full capacity.

5. A filling machine adapted to fill vials with a pharmaceutical preparation comprising a filling head adapted to be connected to a source of the preparation, power means normally effective to operate said filling head cyclically to effect successive filling operations, a conveyor mechanism adapted and arranged to support a plurality of aligned vials arranged in spaced groups with spaces between groups greater than the spacing between centers of any two adjacent vials within a group and for indexing the respective vials of each group successively and intermittently into and out of filling position relative to the filling head, connections between said power means and said conveyor operative to index the conveyor intermittently uniform increments, each increment equalling the spatial distance between centers of any two adjacent vials of a group, filling head latching means operative when actuated to latch the filling head out of action, and means including a cam element carried by and movable with the conveyor at a point operatively related with the normal location with the last vial of a group of vials on the conveyor to actuate said latching means when the last vial of a preceding group has been filled whereby to discontinue the action of the filling head during the index movements of the conveyor between groups of vials and to restore the filling head to normal action when the first vial of a succeeding group of vials has been successively indexed into filling position.

6. The combination set forth in claim 5 characterized by additional control means operatively responsive to the passing of the last of successive groups of vials out of filling relation with the filling head to discontinue the action of the filling head and the movement of the conveyor.

7. A filling machine adapted to fill rows of vials mounted in aligned relation in trays with a pharmaceutical preparation combining a conveyor mechanism adapted to support at least two trays in spaced relation, power means including connections with the conveyor constructed and adapted to move the conveyor intermittently and in uniform increments whereby to effect movement of the vials in the trays successively and intermittently into and out of filling relation with vial filling means, pump means of the piston and cylinder type positioned adjacent the conveyor operative when actuated to effect filling of the vials successively, means comprising said power means and connections to said pump means to actuate same in synchronism with the movements of the conveyor to effect vial filling operations during periods of rest of the conveyor, and means responsive to conveyor movements to render the action of said pump means ineffective during the indexing movements of the conveyor required in moving the last vial of a preceding tray out of filling position and the first vial of a succeeding tray into filling position.

8. The combination set forth in claim 7 including means synchronized with the movement of the last tray of vials placed upon the carrier operative when the last row of vials of said last tray have been filled to discontinue the action of the filling heads and the movement of the carrier.

9. A vial filling machine having in combination, a main frame structure fashioned to support a movable carrier adapted to transport vials, vial locating devices attached to said carrier to locate the vials on the carrier in equally spaced predetermined positions; power means for indexing said carrier in a closed path intermittently, comprising a rotatable cam member, a follower member arranged normally to abut the cam so as to be actuated thereby continuously, and operative connections between the follower and the carrier for transmitting the movement of the former to the latter, relatively stationary vial filling heads adjacent said movable carrier adapted and arranged to fill a selected number of vials when the latter are at rest in filling relation therewith, means to actuate said filling heads from said power means comprising a second rotatable cam member and a second cam follower arranged normally to abut the cam so as to be actuated thereby continuously, each of said cams having follower engaging ascending and descending portions whereby advancing and retractive movements of its associated follower are cyclically effected on rotation of the cams, said portions of the respective cams being relatively positioned out-of-phase so that the carrier is at rest during a filling action and the filling action suspended during a carrier index movement, filling head latching means including additional devices attached to and movable with the carrier operative to latch the said second cam follower out of action on completion of a predetermined number of vial filling operations thereof and thereafter to render the said second cam follower effective on completion of a predetermined indexing movement of the carrier.

10. The combination set forth in claim 9 including manually operable means associated with said filling head latching means operative at will to effect latching of the said second cam follower out of action.

11. The combination of claim 9 including manually operable means associated with the said first mentioned cam follower to lock the said follower out of action whereby to stop indexing movements of the carrier while actuation of the filling heads continue.

FRANK J. COZZOLI.

REFERENCES CITED

The following references are of record in the file of this patent:

UNITED STATES PATENTS

| Number | Name | Date |
|---|---|---|
| 505,005 | Roth | Sept. 12, 1893 |
| 581,700 | Donaly | May 4, 1897 |
| 804,170 | Prince | Nov. 7, 1905 |
| 1,137,128 | Geyer | Apr. 27, 1915 |
| 1,181,090 | Winkley | Apr. 25, 1916 |
| 1,195,611 | Schmitt | Aug. 22, 1916 |
| 1,223,293 | Rose | Apr. 17, 1917 |
| 1,273,988 | Bausman | July 30, 1918 |
| 1,346,948 | Friedman | July 20, 1920 |
| 1,393,276 | Fuller | Oct. 11, 1921 |
| 1,442,405 | Hawthorne | Jan. 16, 1923 |
| 1,659,802 | Bergmann | Feb. 21, 1928 |
| 1,795,312 | Mojonnier et al. | Mar. 10, 1931 |
| 2,142,257 | Saeta | Jan. 3, 1939 |
| 2,414,235 | McManus | Jan. 14, 1947 |